United States Patent [19]

Lonn

[11] 3,970,285
[45] July 20, 1976

[54] BALL VALVE ASSEMBLY
[75] Inventor: Harold J. Lonn, Lombard, Ill.
[73] Assignee: Henry Valve Company, Melrose Park, Ill.
[22] Filed: Oct. 29, 1974
[21] Appl. No.: 518,489

[52] U.S. Cl. ............................. 251/214; 251/288; 251/315
[51] Int. Cl.² ..................................... F16K 31/44
[58] Field of Search ........... 251/214, 284, 286, 287, 251/288, 304, 308, 312, 315; 137/315; 220/319, 378; 277/110, 112

[56] References Cited
UNITED STATES PATENTS

| | | | |
|---|---|---|---|
| 2,912,217 | 11/1959 | Freeman et al. | 251/214 |
| 2,925,243 | 2/1960 | Griswold | 251/284 |
| 2,994,341 | 8/1961 | Leopold, Jr. et al. | 251/288 |
| 2,995,336 | 8/1961 | Usab | 251/315 |
| 3,154,094 | 10/1964 | Bredtschneider et al. | 251/315 |
| 3,239,191 | 3/1966 | Widera | 251/214 |
| 3,269,698 | 8/1966 | Koch | 251/214 |
| 3,331,528 | 7/1967 | Racek | 220/378 |
| 3,696,962 | 10/1972 | Fehres et al. | 220/319 |

*Primary Examiner*—Martin P. Schwadron
*Assistant Examiner*—George L. Walton
*Attorney, Agent, or Firm*—Lockwood, Dewey, Zickert & Alex

[57] ABSTRACT

A ball valve assembly including an easily replaceable stem seal capable of utilization as a primary or secondary seal in a closed circuit system such as a refrigeration circuit or the like where it is (a) not feasible to open the system for changing a leaky seal, or (b) not easy to remove a stem seal from a deep thin annular recess immediately adjacent the valve stem. In the assembly of the invention, the stem seal is located on the valve body between it and a control housing portion which encloses the outer part of the valve stem and packing. A part of the control housing portion may also be rotatably connectable to the valve stem and have external lever means for opening and closing the valve without separating the part from the valve body.

10 Claims, 8 Drawing Figures

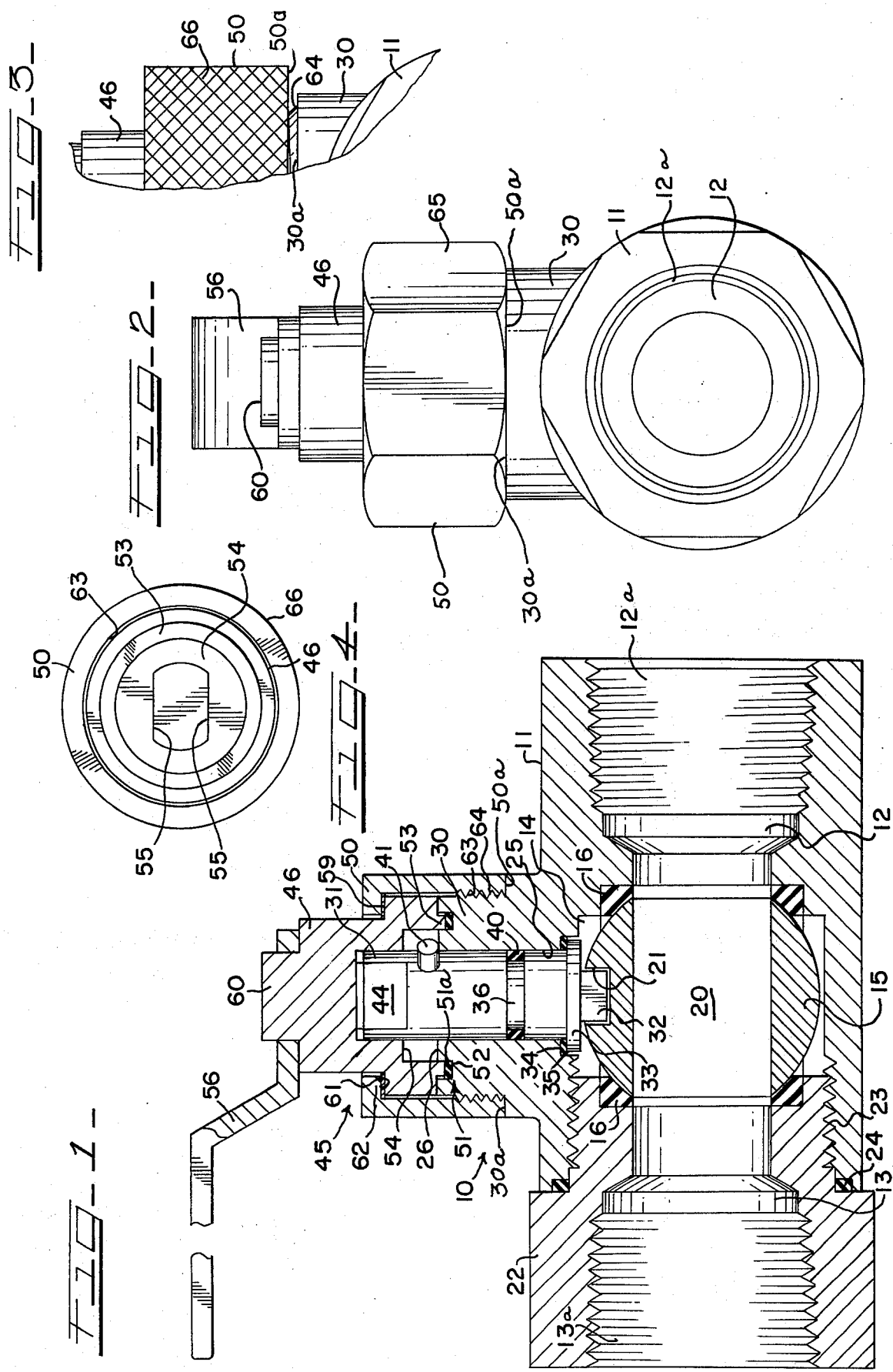

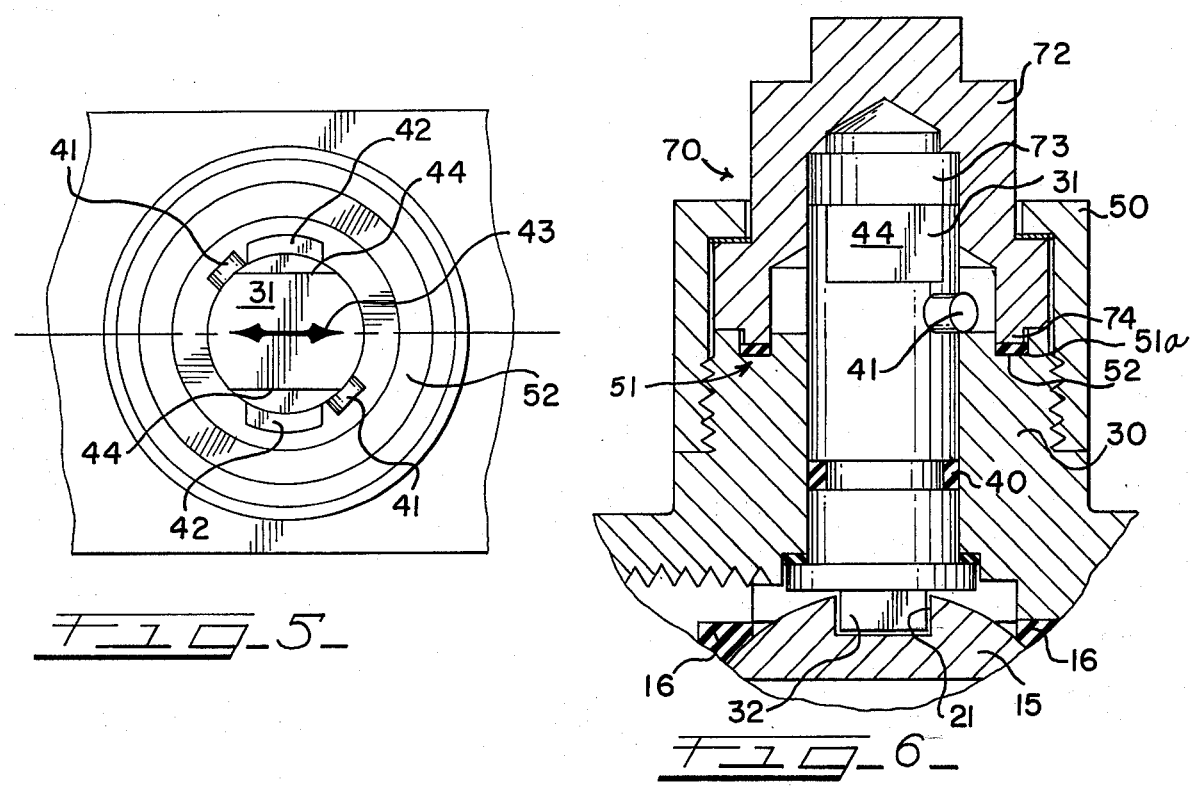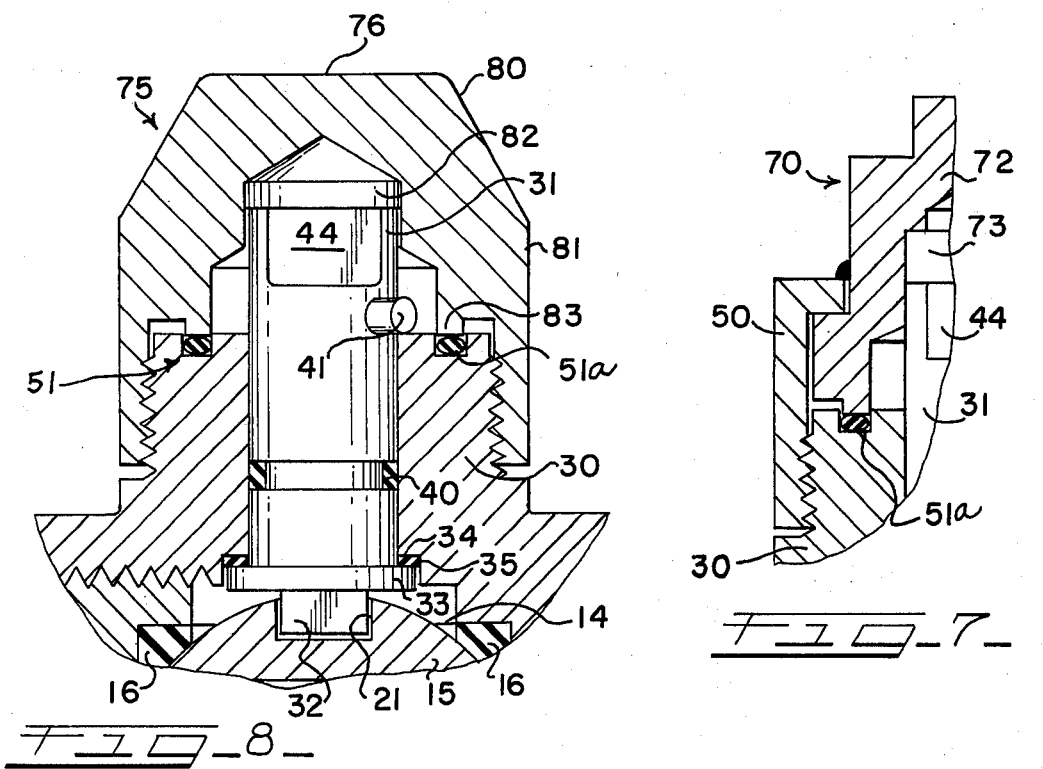

BALL VALVE ASSEMBLY

BACKGROUND OF THE INVENTION

This invention relates to rotatable valve assemblies and more particularly to ball valve assemblies which can be utilized in a fluid carrying line where it is not feasible to open the line to change worn out valve seals.

A major portion of the ball valve are relates to the structure of valve line seals which are located between the valve ball and respective inlet and outlet passageways in communication with the valve ball in a ball valve assembly. Valve stem seals in connection with the valve stem and packing surrounding the stem of a ball valve are also disclosed. Prior to applicant's invention, a stem seal located immediately adjacent the valve stem at the outer end of the valve stem mounting aperture of the valve body could be replaced without removing the valve ball or the valve stem. However, removing the annular packing nut, and seal thereunder, has heretofore been laborious because of the necessity of working closely around the valve stem to maneuver the old seal out of and the new seal into a thin deep cavity closely surrounding the stem.

SUMMARY OF THE INVENTION

Applicant's invention does away with the tedious work of replacing stem seals which fit tightly around the valve stem and are located in thin deep annular recesses between the valve stem and the valve body in a ball valve assembly. Instead of locating a stem seal in the stem mounting aperture between the valve body and the valve stem, the seal is located radially outward in spaced coaxial relation from the valve stem in a shallow annular groove in the top surface of the control housing portion of the valve body. The seal is confined in the annular groove by a mating annular flange in the bottom surface of a cap which covers the otherwise exposed end of the valve stem. The cap may also be connectable to and rotatable with the valve stem and may additionally include external lever means for turning the cap, valve stem, and connected valve ball to open and close the valve without removing the cap. Locating the annular seal in a shallow recess allows for easy removability which is further aided by making the inner diameter of the seal a dimension sufficiently larger than the diameter of the valve stem so as to avoid any frictional contact between the valve stem and seal while it is being removed from the shallow annular groove. The cap is held onto the valve body by a packing nut which, depending on the seal material, may be tightened so as to provide either secondary or primary sealing characteristics.

It is therefore a general object of the invention to provide a stem seal in a ball valve assembly which is more easily removable and replaceable than heretofore known stem seals in ball valve assemblies.

It is a further object of the invention to provide a stem seal in a ball valve assembly which is confined between a control housing portion of the valve body which surrounds the valve stem and a cap which covers the exposed end of the valve stem with the seal being located in spaced coaxial relation to the stem.

A further object of the invention is the provision of an enclosure for housing a stem seal which is capable of utilizing it as either a primary or secondary seal.

An additional object of the invention is to completely confine the stem seal thereby avoiding cold flow or creep of the sealing material during use.

Another object of the invention is the provision of a cap for a ball valve assembly having a rotatable portion in communication with the stem seal, in fixed rotatable connection with the valve stem, and having external lever means located thereon for opening and closing the valve without removing the cap.

BRIEF DESCRIPTION OF THE DRAWINGS

Other objects, features and advantages of the invention will be apparent from the following detailed disclosure, taken in conjunction with the accompanying sheets of drawings, wherein like reference numerals refer to like parts, in which:

FIG. 1 is a side cross-sectional view of a ball valve assembly of the invention showing a valve stem seal located between the valve body and a cap which encloses the control portion of the ball valve assembly and is tightened by a packing nut to provide a primary stem seal;

FIG. 2 is an end elevational view of the ball valve assembly of the invention showing the packing nut having a hex head outer surface suitable for turning with a wrench;

FIG. 3 is a partial end elevational view similar to a portion of FIG. 2 showing a cross-hatched surface on the packing nut which permits hand tightening on the valve body providing a secondary seal capability therebetween;

FIG. 4 is a bottom plan view of the cap and packing nut showing the annular flange and the inner flat surfaces which matingly engage the valve stem;

FIG. 5 is a top plan view of the valve body of the invention with the cap and packing nut removed;

FIG. 6 is a partial side cross-sectional view of the control portion of the ball valve assembly showing a cap which does not have a fixed rotation connection to the valve stem;

FIG. 7 is a partial cross-sectional view similar to a portion of FIG. 6 showing the cap and packing nut joined by a weld therebetween; and FIG. 8 is a partial side cross-sectional view of the control portion of the ball valve assembly showing a combined cap-packing nut which covers the valve stem and confines the stem seal.

DETAILED DESCRIPTION OF THE INVENTION

Referring to the drawings in greater detail, the valve body assembly of the invention is shown generally at 10 in FIG. 1. The assembly 10 includes a valve body housing 11 having identical inlet and outlet passageways 12 and 13. Passageways 12 and 13 are, in this embodiment, internally threaded at 12a and 13a for receiving matingly threaded pipes (not shown). It can be appreciated that other forms of connections, i.e., tube fittings, quick connections, or the like may also be utilized. Valve body 11 also includes a central chamber 14 in communication with inlet and outlet passageways 12 and 13.

A generally spherical valve ball 15 is rotatably mounted in the central chamber 14 between line valve seals 16—16 located in the chamber 14 between the valve ball 15 and the inlet and outlet passageways 12 and 13. Valve ball 15 has a central bore 20 therethrough which connects inlet and outlet passageways 12 and 13 when the valve ball is in open position. Valve ball 15 also has a control notch cutout 21 for aiding in turning the valve ball in its mounting.

The ball valve assembly 10, as shown in FIG. 1, is considered a side entry ball valve. The side entry nomenclature is appropriate because an end portion 22 of the valve body containing the outlet passageway 13 is threadedly disengageable with the rest of the valve body 11 at threads 23. A gasket-seal 24 prevents the leakage of fluid at the juncture of end cap 22 with the remainder of valve body 11. In this embodiment, the end cap 22 is removable from the remainder of valve body 11 enabling the replacement of line valve seals 16—16 and valve ball 20, if necessary. However, the fluid carrying line in which the valve 10 is mounted must be opened if the ball 15 or line seals 16 are to be replaced in the side entry valve assembly. It should be noted the present invention is not limited to such a side entry ball valve assembly. Indeed, the invention may also be utilized equally as well as in other valve assemblies such as a top entry ball valve assembly (not shown).

Valve body 11 also includes a control or valve stem mounting aperture 25 which is round in cross section and extends from central chamber 14 to the outer surface 26 of control housing portion 30 which extends cylindrically outward from valve body 11. A valve stem 31 is rotatably received in the control aperture 25. Valve stem 31 is an elongated shaft generally round in cross section having at its inner end, as mounted in the control aperture, a rectangular detent 32 which matingly slidably engages control slot 21 in valve ball 15. The rotation of valve stem 31 rotates the valve ball 15, thereby aligning and disaligning the central bore 20 with inlet and outlet passageways 12 and 13 opening and closing the valve assembly. A radially extending flange 33 is located inwardly adjacent rectangular detent 32 on the valve stem 31 for maintaining the axial position of the stem in control bore 25. Radial flange 33 is retained by an annular indent 34 at the inner end of control bore 25 in the central chamber 14. A gasket 35 is located between the indent surface 34 and the radial flange 33. The engagement of the rectangular detent 32 with the control slot 21 prevents the valve stem from moving axially downward in relation to the control aperture 25.

Valve stem 31 may be removed from control aperture 25 by sliding the valve ball 15 out its side entrance thereby allowing the valve stem 31 to drop into the central chamber 14 where it can be removed in a manner similar to the valve ball. An annular recess 36, in, around, and coaxial with the valve stem 31 forms a mounting for a conventional stem seal 40, commonly an annular rubber type, for preventing the flow of fluids between the valve stem 31 and the valve stem aperture 25. While conventional stem seals 40 at the location shown in FIG. 1 aid in preventing the escape of fluid through the control aperture, they are not completely effective as they cannot be tightened into position by the surrounding valve structure. This is especially true when the valve is meant to control the flow of refrigerant fluids.

Valve stem 31 also has a peg 41 which extends diametrically through the stem and outward from either side thereof. The peg is positioned externally adjacent the top surface 26 of control housing portion 30. The portions of the peg 41 extending from the valve stem 31 are seen in FIG. 5. Peg 41 rotates with stem 31 and coacts with lugs 42—42 extending from surface 26 to act as a limiting mechanism restricting the rotation of the valve ball 15 to one-quarter turn from full open to full closed position. As also shown in FIG. 5, an arrow 43 located at the exposed end of valve stem 31 indicates the orientation of control bore 20 in the valve ball. In this embodiment, opposing flat surfaces 44—44 at the exposed end of valve stem 41 provide a basis for turning the valve stem 31.

A cover structure 45 (FIG. 1) in this embodiment, includes two pieces, a cap 46 which encloses the valve stem 31, and a packing nut 50 which maintains the cap 46 in its rotatable position covering the valve stem 31 and also secures the cap to the control housing portion 30. The annular stem seal means of the invention, generally at 51, is located between the control housing 30 and the cover structure 45, and includes a shallow annular recess 52 in the top surface 26 of the control housing portion 30 surrounding and in spatial relation to the valve stem 31 and its mounting apertures 25. Annular stem seal 51a is maintained in position in the recess 52 by an annular flange 53 of the sealing means 51 forming the extreme bottom part of the cap 46. The tongue and groove location between annular recess 52 and annular flange 53 assures the complete confinement of the annular seal 51a. The annular stem seal, if made of rubber or a fluro-carbon plastic, tends to creep or cold flow into unconfined areas, thereby permanently distorting its shape and lessening the effect of the seal. Complete confinement keeps the seal in proper shape and therefore assures longevity of effectiveness.

The stem sealing means of the invention 51 may be utilized to provide primary or secondary sealing characteristics depending on (a) the stem seal material, (b) its elastic deformability, and (c) the tightness with which it is maintained between the annular recess 52 and annular flange 53. If seal 51 is made of a fluorocarbon plastic such as is sold under the trademark Teflon, only secondary sealing characteristics are obtained. Teflon does not deform sufficiently when placed between the tongue 53 and groove 52 to provide a dynamic primary seal. However, a Teflon seal provides for easy rotation of the cap 46 on the control housing portion for embodiments as shown in FIG. 1.

A seal 51 made of rubber or the like provides secondary sealing characteristics if packing nut 50 is hand tightened onto control housing portion 30. If packing nut 50 is tightened by wrench means, until the packing nut skirt 50a seats on control housing flange 30a, seal 51a is elastically deformed sufficiently so as to form a primary seal between the cap and housing.

Cap 46 also includes an internal cavity 54 which, in the embodiment shown in FIG. 1, has opposing flat sides 55—55 most clearly shown in FIG. 4 which matingly engage the opposing flat sides 44—44 at the outside end of valve stem 31. The mating engagement between rotatable cap 46 and valve stem 31 allows the valve ball 15 to be turned by a lever 56 which may be integral with a protruding portion 60 at the top of cap 46. Protruding portion 60 may also be hexagonal, square, or other shape in order to fixedly receive a removable handle similar to lever 56. Cap 46 has an outer radial flange 61 on which the inward radial flange 62 of the packing nut 50 seats to trap, retain, and secure the cap in position on top of the control housing portion 30.

In this embodiment, a friction washer 59 is located between flanges 61, 62 to prevent corrosion welding of can 46 to packing nut 50 while allowing rotational relative movement between the two. Packing nut 50 also includes an internally threaded portion 63 which matingly engages threads 64 on the exterior surface of the control housing portion 30. The outside surface packing nut 50 may be hexagonally shaped as shown in FIG. 2 at 65, square, or of other suitable shape to accept a wrench for turning the packing nut 50, as discussed previously, or may have a knurled outer cylindrical surface as shown at 66 in FIG. 3, allowing the cap structure 45 to be manually removable from the control portion 30. FIG. 3 shows a preferred embodiment with the normal appearance of a hand tightened packing nut 50 on the control housing portion 30 providing a secondary seal. FIG. 2 shows a preferred embodiment with the normal appearance of a wrench tightened packing nut 50 in seated skirt position providing a primary seal. It can be appreciated that the normal appearance of the embodiment may be altered, especially if adhesive sealant means is placed between the threads 63, 64 or if annular rubber seals 51a or differing thicknesses are utilized.

In this embodiment, the spatial relation between the valve stem and the annular seal recess 52 allows the seal to be removed and replaced without disturbing the peg 41 mounted through valve stem 31. However, it should be noted that the advantages of the invention do not depend upon the turn limiting peg 41 being included therein.

FIGS. 6, 7, and 8 show modifications in cover structures utilizable in the ball valve assembly. FIG. 6 shows a first modification wherein cover structure 70 is similar to that shown at 46 in FIG. 1 except there is no turning handle and the interior surface of the cap 72 is completely cylindrical or conical as shown at 73 thereby lacking the ability to force valve stem 31 to rotate. This may be desirable if the valve is to be placed in an open area where its unauthorized misuse may likely occur. To change the position of the valve ball in this embodiment, packing nut 50 is turned off of control housing portion 30 and the cap 72 is lifted off of the control housing. A wrench or lever (not shown) may be attached to the valve stem 31 to matingly engage the flat surfaces 44 and thence turn the valve stem. Next, the cap is replaced on the valve body by placing the annular flange 74 over the annular seal 51a located in annular shallow recess 52 and then placing packing nut 50 over cap 72 and turning it onto control housing 30 until it is tightly engaged therewith resealing the valve assembly. When cap structure 70 is off of the valve body housing 30, seal 51a is not effective and the possibility of leakage does exist, especially if line valve seals 16—16 have worn out and the conventional valve stem seal 40 has also worn out. Although some loss of fluid may be encountered, it is considered minimal because cover structure 70 is off of the valve body 11 for a short period of time before it is again resealed. Primary and secondary sealing characteristics may be obtained in all the modifications of the invention as discussed with the first embodiment.

In FIG. 7, the same cover structure 70 is shown, however, it is modified by welding the packing nut 50 to the cap 72 at weld 74 thereby creating a one piece cover economically from the two piece one previously described. Other suitable connecting means may be utilized.

In FIG. 8, a third modification of the cover structure is shown generally at 75. Cover structure 75 combines the packing nut and cap of the previously discussed two piece cover structure 70 of FIG. 7 into one casting, forging, machining or the like. Cover structure 75 has a flat top surface 76, a frusto-conical beveled surface 80 and an outer vertical surface 81 which may be similar to surfaces 65 and 66 as shown in FIGS. 2 and 3, respectively. The inner cylindrical and conical surface 82 is similar in function to the cylindrical and conical surface 73 as shown in FIG. 6. The inner surface 82 provides a clearance for the protruding valve stem 31 without engaging the stem in fixed rotatable engagement. Annular valve seal 51a is retained by annular flange 83 in the same manner as previously described with the first embodiment.

It will be understood that modifications and variations may be effected without departing from the scope of the novel concepts of the present invention, but it is understood that this application is limited only by the scope of the appended claims.

I claim:

1. A ball valve assembly comprising, in combination: a valve body member, a valve ball, a valve stem, and a cover member, said valve body member including a central chamber in which said valve ball is rotatably mounted, aligned inlet and outlet passageways, and a valve stem mounting aperture in communication with said chamber and oriented outwardly therefrom, said valve stem being rotatably received in said stem mounting aperture and extending outwardly therefrom including means at an inner end of said stem for fixed rotational connection to said valve ball, means maintaining a fixed axial relation between said stem and said mounting aperture, means for rotating said stem located at the portion of said stem extending from said mounting aperture, a cover member removably securable to said valve body member for covering the extending portion of said valve stem and the outer end of said mounting aperture, and an annular stem seal for further preventing the escape of fluid through said valve stem aperture, said annular stem seal retained between said cover member and said body member in an annular recess in one of said members encircling said valve stem in coaxial and spaced relation thereto, said annular seal being confined in said recess by an annular protuberance extending from the other of said members in mating relation to said recess.

2. The ball valve assembly of claim 1 wherein said annular recess for retaining said stem seal is located in said valve body member, and said mating annular protuberance is located on said cover member.

3. The ball valve assembly of claim 1 wherein said cover member comprises a cap for enclosing said exposed end of said valve stem and retaining said stem seal between said cap and said valve body member, and a separate packing nut surrounding and retaining at least the periphery of said cap for rotatably and removably engaging said cap with said valve body member.

4. The ball valve assembly of claim 3 wherein said cap includes an inner surface defining a cavity in said cap and means on said surface for matingly engaging said means at the extended portion of said stem for rotating same.

5. The ball valve assembly of claim 4 wherein said cap further includes external means for rotating said cap, said valve stem, and said valve ball interconnected therewith, and said stem seal between said cap and said valve body member includes means for enabling the sealing relation between said cap and said valve body member to remain intact as the cap is rotated relative said valve body member.

6. In a ball valve assembly including a generally spherical valve ball, valve body means for enclosing portions of said assembly, said valve body means having a central chamber in which said valve ball is rotatably disposed, inlet and outlet passageways in communication with said central chamber, line seal means between said valve ball and the peripheries of said passageways, a control opening in communication with said chamber and extending outwardly therefrom, a valve stem rotatably mounted in said control opening and extending therethrough including means at an inner end of said stem for connection to said valve ball, and means for facilitating rotation of said stem and said valve ball connected thereto, cover means removably engaging said valve body means for enclosing the otherwise exposed outer portions of said valve stem and said control opening, the improvement comprising a stem seal between said cover means and said valve body means for preventing the escape of any fluid passing said line seals, said stem seal located in an annular recess in said valve body means surrounding in spaced relation and coaxial with said control opening, said stem seal confined in said annular recess by an annular flange on said cover means which matingly engages said recess in said valve body means in a tongue and groove relationship, whereby said stem seal is easily replaceable while said valve is in use.

7. In the ball valve assembly of claim 6 wherein the cover means comprises a cap which encloses the outer portions of said valve stem and said control opening and includes said annular flange, and a packing nut rotatably retaining said cap, matingly engaging said valve body means, and selectably separable from said cap and said valve body means for securing said cap to said valve body means while allowing said cap to rotate relative said valve body means.

8. In the ball valve assembly of claim 7 wherein said means for facilitating rotation of said stem and said valve ball connected thereto comprises an inner generally concave surface in said cap which matingly engages an outer portion of said stem providing a fixed rotational relation therebetween, and means on the outside surface of said cap capable of engaging lever means for turning said cap.

9. In a rotating valve assembly capable of having refrigerant fluids flow therethrough and preventing the escape of same through valve control means located therein, said assembly including a valve member, valve body means for enclosing portions of said assembly, said valve body means having a central chamber in which said valve member is rotatably mounted, inlet and outlet passageways in communication with line sealing means between said valve member and the peripheries of said passageways for preventing fluid from escaping said valve assembly through said control means, said valve control means including; a control aperture in said valve body means in communication with said chamber and extending outwardly therefrom, an elongate valve stem rotatably mounted in said control aperture including means at an inner end of said stem for receiving said valve member in fixed rotational relation thereto, the improvement comprising a cover, and annular stem seal means for further preventing escape of said fluid and for allowing replacement thereof while said valve is in use, said annular stem seal means including a stem seal located in an annular recess in said body means oriented coaxially with and in spaced relation to said control aperture, said cover including a cap for enclosing the outer portions of said valve stem and said control aperture having an annular flange on a bottom surface thereof which matingly engages said annular recess in said valve body means to retain said seal in said recess, means for connecting said cover to said valve stem in fixed rotational relation, means at the top of said cap for facilitating rotating same, and a packing nut rotatably retaining said cap and matingly engaging said valve body means for securing said cap to said valve body means allowing a rotatable relationship therebetween.

10. The rotating valve assembly of claim 9 wherein said stem seal is made of a fluro-carbon plastic.

* * * * *

UNITED STATES PATENT AND TRADEMARK OFFICE
CERTIFICATE OF CORRECTION

PATENT NO. : 3,970,285
DATED : July 20, 1976
INVENTOR(S) : Harold J. Lonn

It is certified that error appears in the above-identified patent and that said Letters Patent are hereby corrected as shown below:

Column 1, Line 9, delete "are" and insert --art--;

Column 5, Line 21, in the second occurrence of "or", delete "or" and insert --of--.

Signed and Sealed this

Twenty-sixth Day of October 1976

[SEAL]

Attest:

RUTH C. MASON
Attesting Officer

C. MARSHALL DANN
Commissioner of Patents and Trademarks